Patented Apr. 14, 1925.

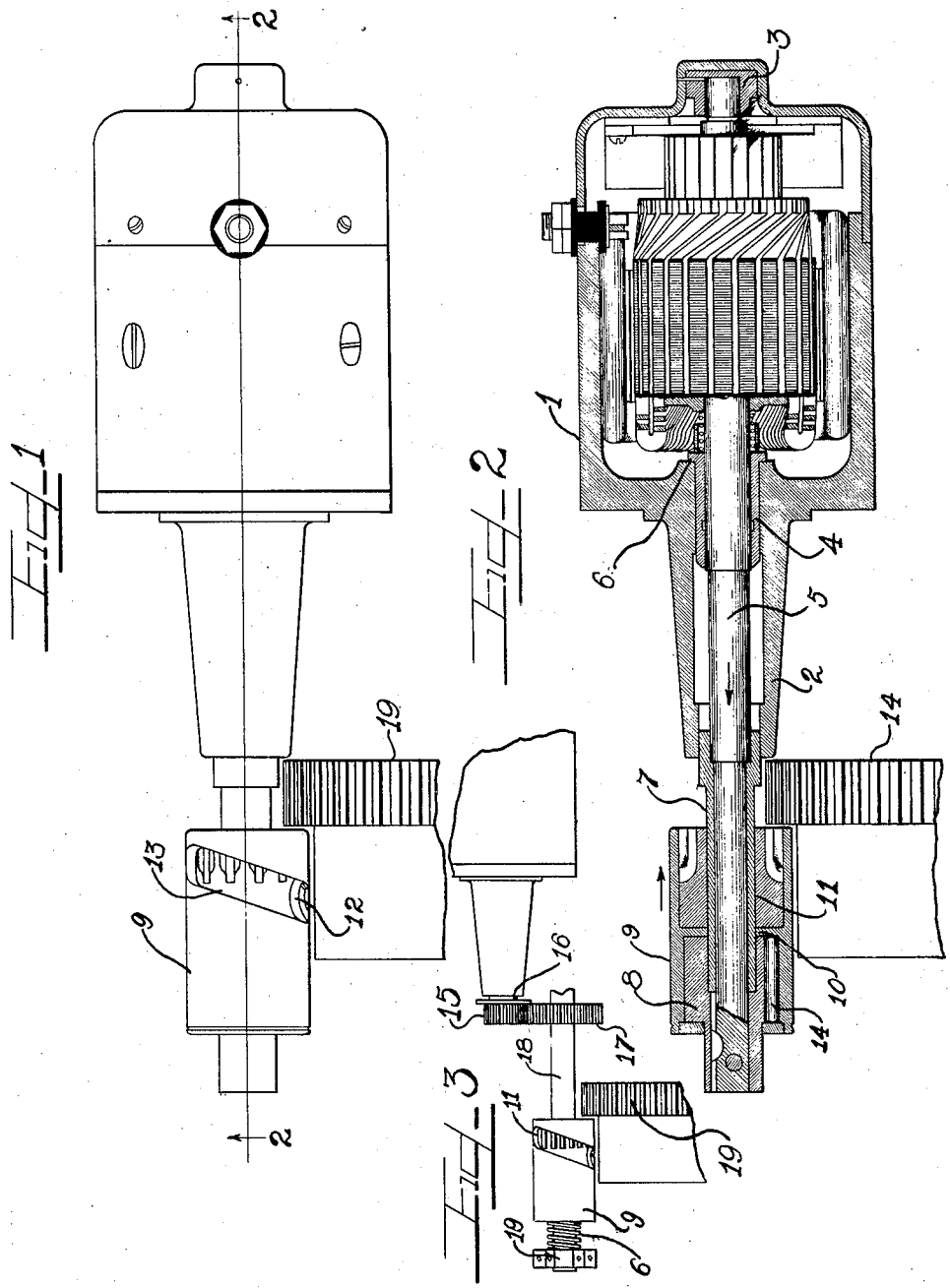

1,533,373

UNITED STATES PATENT OFFICE.

ODILON BRISBOIS, OF CHICAGO, ILLINOIS.

STARTING MECHANISM FOR AUTOMOBILES.

Application filed August 2, 1922. Serial No. 579,168.

*To all whom it may concern:*

Be it known that I, ODILON BRISBOIS, a citizen of the United States, and a resident of the city of Chicago, in the county of Cook and State of Illinois, have invented certain new and useful Improvements in a Starting Mechanism for Automobiles; and I do hereby declare that the following is a full, clear, and exact description of the same, reference being had to the accompanying drawings, and to the numerals of reference marked thereon, which form a part of this specification.

This invention relates to a starting mechanism for automobiles and the like of that type in which a driving pinion is brought into mesh with a gear member on the engine shaft.

During the movement of the driving pinion into mesh with the gear on the engine shaft, there is frequently a violent tooth on tooth engagement that results in a binding effect and seriously cuts and damages the gears so that they must soon be replaced.

It is an object of this invention to overcome this objection by providing a freely floating shaft susceptible to two opposed forces which tend to balance the same, whereby a very delicate longitudinal flutter of the shaft may be secured, so that substantially all impact and binding of the gears will be avoided and the consequent injury to the gears.

It is a further object of this invention to provide a pair of members having different rates of movement in opposite directions whereby movement of the driving pinion toward meshing relation is reduced.

It is broadly an object of this invention to provide a freely floating shaft during the operation of bringing the gears into meshing relation.

With these and other objects in view which will become more apparent in the following description and disclosures, this invention comprises the novel mechanism and combinations hereinafter described and more particularly pointed out in the appended claims.

In the accompanying drawings which illustrate certain preferred forms of this invention and in which similar reference numerals refer to similar features in the different views:

Figure 1 is an elevational view of a starting mechanism with parts of the engine gear member involving this invention.

Figure 2 is a section upon the line 2—2 of Figure 1 with a part of the engine fly wheel shown in position.

Figure 3 is a fragmentary elevational view of a modified form of the invention upon a reduced scale.

In referring now to Figures 1 and 2 of the drawings, the reference numeral 1 represents a motor casing having an extended bearing portion 2 at its forward end and a bearing socket 3 at its rear end. In the present instance, a bearing bushing 4 is shown within the extended portion 2 to provide a smooth bearing surface. A freely floating motor shaft 5 is rotatably supported in the bushing 4 and socket 3, and said shaft carries the usual armature. A light coil spring 6 susceptible to the magnetic action of the electric field of the motor surrounds the shaft 5 and is confined between the front of the motor casing or housing and the armature. The tendency of the spring 6 is to shift the armature into a position rearwardly of its field as shown in Figure 2. The forward portion of the motor shaft may be mounted in a bushing 7 slidably supported in the forward end of the extended portion 2 of the casing 1. The inner member 8 of a one-way roller clutch is secured upon the end of the motor shaft 5. The outer member of said clutch is in the form of a cylindrical shell 9 having a central partition 10 forming a forward compartment for receiving the inner clutch member 8 and a rear compartment for receiving and housing a driving pinion 11 having a stud 12 projecting through a helical slot 13 in the shell 9. Rollers such as indicated at 14 are mounted in recesses in the inner clutch member and produce a frictional connection between the two clutch members upon relative rotation of the clutch members in one direction. The construction is however such that the clutch will yield under a predetermined load such as arises in case of back-fire as set forth in my co-pending application Serial No. 534,361, filed February 26th, 1922. The clutch is preferably secured upon the motor shaft so that the driving pinion 11 is adjacent the gear 19 on the engine shaft.

When the motor is started, the magnetic force will draw the armature forwardly into its field against the tension of the spring 6, until a substantial balance is reached. The spring 6 and magnetic force constitute two forces that tend to move the armature shaft in opposite directions until a balance is reached, with the consequent result that during the operation of bringing the gears into mesh, the motor shaft will be in a freely floating state, and controlled in its longitudinal movements by the two opposed forces which are susceptible of being unbalanced by exceedingly slight variations, producing what might be termed a longitudinal flutter of the armature shaft.

It will be appreciated that when the motor shaft is drawn forwardly under the magnetic force during the starting of the motor, the driving pinion 11 will be moved in a direction away from the gear 19. However, the rotation of the armature shaft will cause the gear 11 through the special slot and pin connection to travel toward the gear 19 so that the actual longitudinal advance of gear 11 toward gear 19 will be the differential of these opposed movements of the shaft 5 and gear 11. Accordingly, the gear 11 will be brought into contact with the fly wheel gear 19 at a reduced speed so that there will be very little momentum to cause impact and clashing of gears. This reduction of the longitudinal speed of driving gear 11 is important in preventing impact or clashing of the gears since it will be appreciated that any rapidly moving body through space will produce an impact according to its momentum even though this body is freely supported and may rebound after impact.

In cases where the teeth of the driving pinion 11 aline with the teeth on the flywheel gear 19 producing a tooth on tooth engagement when the gears are brought into mesh, there will be substantially no impact or binding effect on account of the reduced speed of longitudinal travel of the pinion 11 and the freely floating character of the armature shaft that is longitudinally balanced between two forces.

In Figure 3 there is illustrated a modified form of the invention involving a countershaft. In this case, a gear 15 is secured upon the end of the armature shaft and this gear is provided upon its inner end with a radially projecting flange 16 overlapping a gear 17 on a countershaft 18 upon which the shell 9 and driving pinion 11 are mounted. In this case, the light coil spring 6 is positioned upon the shaft 18 between the end of the clutch and a bearing 19 in which the countershaft 18 freely floats. The other end of the countershaft may be slidably mounted in a suitable bearing. In this modified form, the gear 15 on the motor shaft meshes with gear 17 for imparting rotation to the countershaft for causing the driving pinion 11 to advance into mesh with the fly-wheel gear 19 as is obvious. Normally the spring 6 shifts the shaft 18 to the right as viewed in the drawing, the gear 17 contacting the flange 16 and shifting the armature shaft inwardly to the rear of its field, so that whenever the motor is started the armature shaft will advance forwardly; the flange 16 engaging the gear 17 for shifting the countershaft forwardly or to the left against the tension of the spring 6, while the driving pinion moves rearwardly producing a differential movement, and an operation similar to the one described in connection with the first form.

It will be appreciated that the starting motor must have sufficient torque and hence a high speed of rotation in order to accomplish its function, so it will necessarily draw the pinion inwardly at a high rate of speed, and that the only way of slowing the longitudinal speed of the pinion and still retain the proper speed and torque of the motor exists in providing a longitudinally movable driving or motor shaft that carries the pinion in a direction opposite to meshing relation, but at a slower rate of speed than the pinion is traveling toward meshing relation. By varying the resistance of the spring 6, the forward longitudinal speed of the motor shaft may be varied in order to obtain any predetermined differential of speed of longitudinal movement between the pinion and its shaft, and it likewise determines the amount of forward longitudinal travel of the motor shaft.

From the foregoing, it will be apparent that the starter involving this invention comprises a freely floating shaft longitudinally balanced between two opposing forces susceptible of being unbalanced by slight variations and in which the longitudinally movable driving gear has a retarded longitudinal movement with respect to the floating shaft for eliminating impact clashing of gears and binding.

I am aware that numerous details of construction may be varied through a wide range without departing from the principles of this invention, and I therefore do not purpose limiting the patent granted otherwise than is necessitated by the prior art.

I claim as my invention:

1. In an engine starter, a freely floating driving shaft longitudinally balanced between two opposed forces susceptible of being unbalanced by slight variations, a driving pinion mounted upon said shaft for longitudinal movement thereof and rotary movement therewith, and means for causing a longitudinal movement of said shaft in a direction opposed to the movement of said pinion when traveling into meshing relation to reduce the longitudinal speed of said pinion into meshing relation.

2. The combination with the driven member of an engine shaft, of a starter therefor comprising a freely floating shaft, a driving member mounted upon said shaft for longitudinal movement thereof and rotary movement therewith, and means for automatically shifting said shaft and driving member in opposite longitudinal directions for the purpose described.

3. In in engine starter, a freely floating driving shaft, a driving member mounted thereon for longitudinal movement thereof and rotary movement therewith, and means for producing a differential longitudinal movement of said shaft and driving member.

4. In an engine starter, a freely floating driving shaft, a driving member mounted thereon for longitudinal movement thereof and rotary movement therewith, and means for longitudinally balancing said driving shaft between opposed forces susceptible of being unbalanced by slight variations.

5. The combination with the driven member on an engine shaft, of a starter therefor comprising a shaft, a gear mounted on said shaft for longitudinal movement thereof and rotary movement therewith, and means for automatically moving said shaft in a longitudinal direction opposed to the longitudinal movement of said gear when said gear is moving into meshing relation for retarding the longitudinal movement of said gear.

6. A pair of members having relative longitudinal movement and adapted to be brought into coacting relation, a floating support for the movable member, and means for longitudinally moving said support and movable member in opposite directions.

7. In a device of the class described, a pair of members having relative longitudinal movement and adapted to be brought into coacting relation, a movable support for the movable member, and means for causing a differential movement between said movable support and movable member.

In testimony whereof I have hereunto subscribed my name in the presence of two subscribing witnesses.

ODILON BRISBOIS.

Witnesses:
OSCAR HARTMANN,
FRED E. PAESLER.